United States Patent
Bruneau (10) Patent No.: US 10,243,728 B2
(45) Date of Patent: *Mar. 26, 2019

(54) VERIFICATION OF THE RESISTANCE OF AN ELECTRONIC CIRCUIT TO SIDE-CHANNEL ATTACKS

(71) Applicant: STMicroelectronics (Rousset) SAS, Rousset (FR)

(72) Inventor: Nicolas Bruneau, Sainte Foy les Lyon (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 253 days.

This patent is subject to a terminal disclaimer.

(21) Appl. No.: 15/046,092

(22) Filed: Feb. 17, 2016

(65) Prior Publication Data
US 2017/0063522 A1 Mar. 2, 2017

(30) Foreign Application Priority Data
Sep. 2, 2015 (FR) ...................... 15 58117

(51) Int. Cl.
*H04L 29/06* (2006.01)
*H04L 9/00* (2006.01)
(Continued)

(52) U.S. Cl.
CPC ............... *H04L 9/003* (2013.01); *G09C 1/00* (2013.01); *H04L 9/0631* (2013.01); *H04L 2209/043* (2013.01)

(58) Field of Classification Search
CPC . H04L 9/003; H04L 9/0631; H04L 2209/043; H04L 2209/04; G09C 1/00
See application file for complete search history.

(56) References Cited

U.S. PATENT DOCUMENTS

| 7,403,620 B2 | 7/2008 | Liardet et al. |
| 2003/0044003 A1 | 3/2003 | Chari et al. |

(Continued)

FOREIGN PATENT DOCUMENTS

| CN | 101009554 A | 8/2007 |
| CN | 102904716 A | 1/2013 |

(Continued)

OTHER PUBLICATIONS

Federal Information Processing Standards Publication 197, "Announcing the Advanced Encryption Standard (AES)," Nov. 26, 20101, 51 pages.

(Continued)

*Primary Examiner* — Joseph P Hirl
*Assistant Examiner* — Chi D Nguy
(74) *Attorney, Agent, or Firm* — Seed IP Law Group LLP (57) ABSTRACT

A method of verifying the sensitivity of an electronic circuit executing a Rijndael-type algorithm to side channel attacks, wherein: each block of data to be encrypted or to be decrypted is masked with a first mask before a non-linear block substitution operation is applied based on a substitution box, and is then unmasked with a second mask after the substitution; the substitution box is recalculated, block by block, before the non-linear operation is applied, the processing order of the blocks of the substitution box being submitted to a permutation; and a side channel attack is performed on the steps of recalculating, block by block, the substitution box.

28 Claims, 6 Drawing Sheets

(51) Int. Cl.
*H04L 9/06* (2006.01)
*G09C 1/00* (2006.01)

(56) References Cited

U.S. PATENT DOCUMENTS

| | | | |
|---|---|---|---|
| 2004/0028224 A1 | 2/2004 | Liardet et al. | |
| 2004/0091107 A1 | 5/2004 | Fujisaki et al. | |
| 2008/0253557 A1 | 10/2008 | Dottax et al. | |
| 2010/0086126 A1 | 4/2010 | Yokota et al. | |
| 2010/0246808 A1* | 9/2010 | Hisakado | H04L 9/0618 380/1 |
| 2012/0250854 A1 | 10/2012 | Danger et al. | |
| 2012/0257747 A1 | 10/2012 | Liardet et al. | |
| 2014/0211937 A1 | 7/2014 | Coric et al. | |
| 2014/0351603 A1* | 11/2014 | Feix | H04L 9/003 713/189 |
| 2016/0105276 A1 | 4/2016 | Brumley et al. | |

FOREIGN PATENT DOCUMENTS

| | | |
|---|---|---|
| CN | 102983964 A | 3/2013 |
| WO | 2009/043139 A1 | 4/2009 |
| WO | 2012/146550 A1 | 11/2012 |

OTHER PUBLICATIONS

Kocher et al., "Differential Power Analysis," *CRYPTO 99 Conference*, 1999, 10 pages.

Brunean et al., "Multi-Variate High-Order Attacks of Shuffled Tables Recomputation," *International Workshop on Cryptographic Hardware and Embedded Systems*, Springer Berlin Heidelberg, 2015, pp. 1-20.

Coron, "Higher Order Masking of Look-up Tables," *Annual International Conference on the Theory and Applications of Cryptographic Techniques*, Springer Berlin Heidelberg, 2014, 21 pages.

Herbst et al., "An AES Smart Card Implementation Resistant to Power Analysis Attacks," *International Conference on Applied Cryptography and Network Security*, Springer Berlin Heidelberg, 2006, pp. 239-252.

Itoh et al., "DPA countermeasure Based on the "Masking Method"," *International Conference on Information Security and Cryptology*, Springer Berlin Heidelberg, 2001, pp. 440-456.

Daemen et al., *The Design of Rijndael*, AES—The Advanced Encryption Standard, Springer-Verlag Berlin Heidelberg New York, 2002, 238 pages.

"Advanced Encryption Standard," Wikipedia, retrieved from https://en.wikipedia.org/w/index.php?title=Advanced_Encryption_Standard&oldid=620143005 on Aug. 6, 2014, 10 pages.

Stack Exchange Network, "Prove XOR is commutative and associative," downloaded from http://math.stackexchange.com/questions/293793/prove-xor-is-commutative-and-associative on Jul. 2, 2018, 2 pages.

Yang, "[Study on Smart Card Attack and Defense Based on AES Algorithm]," master's thesis, Dec. 2013, pp. 35-49. (27 pages) (with Partial English Machine Translation).

* cited by examiner

VERIFICATION OF THE RESISTANCE OF AN ELECTRONIC CIRCUIT TO SIDE-CHANNEL ATTACKS

BACKGROUND

Technical Field

The present disclosure generally relates to electronic circuits and, more particularly, to circuits executing encryption algorithms known as Rijndael algorithms, which implement a same transformation on different portions of data to be encrypted. The present disclosure more specifically relates to the protection of a calculation executed by such an algorithm against attacks by differential power analysis (DPA).

Discussion of the Related Art

In many applications, electronic circuits implement algorithms of encryption, verification, signature, and more generally algorithms manipulating data, called secret data, that is, the access to which is desired to be reserved to certain users or circuits. Among Rijndael algorithms, the AES algorithm, often called AES (Advanced Encryption Standard, FIPS PUB 197), processes data blocks having a size set to 128 bits and is a particularly common encryption algorithm. The AES applies to a word or message divided into blocks a same transformation a plurality of times in a row based on different sub-keys originating from a same key.

There exist many methods, called attacks, to attempt discovering or to pirate secret data. Among such attacks, so-called side channel attacks comprise analyzing the influence of the calculation executed by the electronic circuit on parameters such as its power consumption, its electromagnetic radiation, etc. A particularly common side channel attack is the attack known as DPA (Differential Power Analysis). Such an attack comprises correlating the power consumption of the integrated circuit executing the algorithm with calculation results involving the secret keys used during the encryption or the decryption. In practice, based on a message to be encrypted and on assumptions relative to the secret key, a curve of statistic correlation over time between the circuit power consumption for the encryption of the message and an intermediate value calculated by the circuit is plotted. Such power analysis attacks are widely described in literature (see for example the article "Differential Power Analysis" by Paul Kocher, Joshua Jaffe, and Benjamin Jun, published in 1999, CRYPTO 99 Conference, pages 388 to 397, published by Springer-Verlag LNCS 1666).

BRIEF SUMMARY

An embodiment may facilitate overcoming all or part of the disadvantages of usual methods and circuits of protection against side channel attacks.

An embodiment provides a method of calculating an AES algorithm which may facilitate overcoming all or part of the disadvantages of usual methods.

An embodiment provides a method of verifying the sensitivity of an electronic circuit executing an AES algorithm to a side channel attack.

In an embodiment, a method comprises verifying the sensitivity of an electronic circuit executing a Rijndael-type algorithm to side channel attacks, wherein:

each data block to be encrypted or decrypted is masked with a first mask before applying a non-linear block substitution operation based on a substitution box, and is then unmasked with a second mask after the substitution;

the substitution box is recalculated, block by block, before applying the non-linear operation, the order of processing of the blocks of the substitution table being submitted to a random permutation; and a side channel attack is performed on the steps of recalculating, block by block, the substitution box.

According to an embodiment, the attack is a differential power analysis at least of second order.

According to an embodiment, the circuit is considered as sensitive to the attack if the latter enables to directly or indirectly determine the value of at least one of the masks.

According to an embodiment, the recalculation of the substitution box uses the second mask as well as third and fourth masks, the sum of the third and fourth masks being equal to the first mask.

According to an embodiment:
successively for each block in the first box:
the rank of the current block is submitted to said permutation and the result is combined with the third mask;
the current block of a second box is replaced with the combination of the second mask with the block of the first box identified by the result of the permutation; and
successively for each block in the second box:
the rank of the current block is submitted to said permutation and the result is combined with the fourth mask;
the current block of the first box is replaced with the block of the second box identified by the result of the permutation.

According to an embodiment, the method comprises the steps of:
successively for each block in the first box:
in a first step, applying the permutation to the rank of the current block, combining the result with the first mask, and storing the result in a first variable;
in a second step, storing in a second variable the result of the combination of the second mask with the block of the first box having as a rank the result of the permutation applied to the rank of the current block; and
storing the result of the second step in a block, identified by the result of the first step, of a second box;
successively for each block in the second box:
in a third step, applying the permutation to the rank of the current block, combining the result with the second mask, and storing the result in the first variable;
in a fourth step, storing in the second variable the block of the second box having as a rank the result of the permutation applied to the current rank; and
storing the result of the fourth step in a block, identified by the result of the third step, of the first box.

According to an embodiment:
the blocks of the first box are copied in a second box;
successively for each block in the second box:
the rank of the current block is submitted to said permutation and the result is combined with the third mask;
the current block of the first box is replaced with the combination of the second mask with the block of the second box identified by the result of the permutation; and
successively for each block in the first box:
the rank of the current block is submitted to said permutation and the result is combined with the fourth mask;
the current block of the second box is replaced with the block of the first box identified by the result of the permutation.

According to an embodiment, the method comprises the steps of:
copying the blocks of the first box in a second box;

successively for each block in the second box:
in a first step, applying the permutation to the rank of the current block, combining the result with the first mask, and storing the result in a first variable;
in a second step, storing in a second variable the result of the combination of the second mask with the block of the second box having as a rank the result of the permutation applied to the rank of the current block; and
storing the result of the second step in a block of the first box, identified by the result of the first step;
successively for each block in the first box:
in a third step, applying the permutation to the rank of the current block, combining the result with the second mask, and storing the result in the first variable;
in a fourth step, storing in the second variable the block of the first box having as a rank the result of the permutation applied to the current rank; and
storing the result of the fourth step in a block, identified by the result of the third step, of the second box.

According to an embodiment, the random permutation is commutative with the non-linear substitution operation.

According to an embodiment:
successively for each block in the substitution box:
in a first step, the rank of the block is submitted to said permutation and is combined with the first mask;
in a second step, the block is submitted to the permutation and the result is combined with the second mask; and
the block, identified by the result of the first step, is substituted with the result of the second step.

According to an embodiment, the method comprises the steps of:
successively for each block in the substitution box:
in a first step, applying the permutation to the rank of the current block, combining the result with the first mask and storing the result in a first variable;
in a second step, applying the permutation to the current block, combining the result with the second mask, and storing the result in a second variable; and
replacing the block of the substitution box having as a rank the result of the first step with the result of the second step.

According to an embodiment, the masks are random numbers.

According to an embodiment, the masks all have the same size as a block.

According to an embodiment, the combinations are of XOR type.

According to an embodiment, the method is applied to the AES.

In an embodiment, an electronic circuit, in operation, implements a method disclosed herein.

In an embodiment, a method comprises: verifying a sensitivity of an electronic circuit executing a Rijndael-type algorithm to side-channel attacks, wherein: each block of data to be processed is masked with a first mask before applying a non-linear block substitution operation based on a substitution box, and is then unmasked with a second mask after the substitution; the substitution box is recalculated, block by block, before applying the non-linear substitution operation, an order of processing of the blocks of the substitution box being submitted to a permutation; and the verifying includes: performing a side-channel attack on the recalculating, block by block, of the substitution box; and determining the sensitivity of the electronic circuit based on a result of the side-channel attack. In an embodiment, the attack is a differential power analysis at least of second order. In an embodiment, the determining comprises comparing the result of the attack to at least one of the masks. In an embodiment, the electronic circuit is determined to be sensitive to the attack if the result of the attack provides a value of at least one of the masks. In an embodiment, the permutation is random and the recalculation of the substitution box is based on the second mask, a third mask and a fourth mask, a combination of the third and fourth masks being equal to the first mask. In an embodiment, the executing of the Rijndael-type algorithm includes: successively for each block in the first substitution box: submitting a rank of a current block is submitted to said permutation and combining a result of the permutation of the rank of the current block with the third mask; and replacing the current block of a second box with a combination of the second mask with a block of the first box identified by the result of the permutation of the rank of the current block; and successively for each block in the second substitution box: submitting a rank of a current block to said permutation and combining a result of the permutation of the rank of the current block with the fourth mask; and replacing the current block of the first substitution box with a block of the second substitution box identified by the result of the permutation of the rank of the current block. In an embodiment, the executing of the Rijndael-type algorithm includes: successively for each block in the first box: in a first step, applying the permutation to a rank of a current block, combining a result of the permutation of the rank of the current block with the first mask, and storing a result of the combination in a first variable; in a second step, storing in a second variable a result of a combination of the second mask with a block of the first box having a rank of the result of the permutation applied to the rank of the current block; and storing the second variable in a block of a second box having a rank of the first variable; and successively for each block in the second box: in a third step, applying the permutation to a rank of a current block, combining a result of the permutation of the rank of the current block with the second mask, and storing a result of the combination in the first variable; in a fourth step, storing in the second variable the block of the second box having a rank the result of the permutation applied to the rank of the current block; and storing the second variable in a block of the first box having a rank of the first variable. In an embodiment, the executing of the Rijndael-type algorithm includes: copying the blocks of the first box into a second box; successively for each block in the second box: submitting a rank of a current block to said permutation and combining a result of the permutation of the rank with the third mask; and replacing the current block of the first box with a combination of the second mask with a block of the second box identified by the result of the permutation of the rank; and successively for each block in the first box: submitting a rank of a current block to said permutation and combining a result of the permutation of the rank with the fourth mask; and replacing the current block of the second box is replaced with the block of the first box having a rank of the result of the permutation of the rank of the current block. In an embodiment, the executing of the Rijndael-type algorithm includes: copying the blocks of the first box into a second box; successively for each block in the second box: in a first step, applying the permutation to a rank of a current block, combining a result of the permutation of the rank with the first mask, and storing the combination in a first variable; in a second step, storing in a second variable a result of a combination of the second mask with a block of the second box having a rank of the result of the permutation of the rank of the current block; and storing the second variable in a block of the first box having a rank of the first variable; and successively for each block in the first box: in a third step, applying the permutation to a rank of a current block, combining a result of the permutation of the rank with the second mask, and storing the combination in the first variable; in a fourth step, storing in the second variable a block of the first box having a rank of the result of the permutation of the current rank; and storing the second variable in a block of the second box having a rank of the first variable. In an embodiment, the permutation is commutative with the non-linear substitution operation. In an embodiment, the executing of the Rijndael-type algorithm includes: successively for each block in the substitution box: submitting a rank of the block to said permutation and combining the permutated rank with the first mask; submitting the block to the permutation and combining the permutated block with the second mask; and replacing a block having a rank equal to the combination of the permutated rank and the first mask with the combination of the permutated block and the second mask. In an embodiment, the executing of the Rijndael-type algorithm includes: successively for each block in the substitution box: applying the permutation to a rank of a current block; combining the permutated rank with the first mask; and storing a value of the combination of the permutated rank and the first mask in a first variable; applying the permutation to the current block; combining the permutated block with the second mask; and storing a value of the combination of the permutated block with the second mask in a second variable; and replacing the block of the substitution box having as a rank the stored value of the first variable with the stored value of the second variable. In an embodiment, the masks are random numbers. In an embodiment, the masks have a same size as a block. In an embodiment, the combinations are of an XOR type. In an embodiment, the executing of the Rijndael-type algorithm includes applying an Advanced Encryption Standard algorithm.

In an embodiment, an apparatus comprises: an interface configured to couple to an electronic circuit; control circuitry coupled to the interface, wherein, in operation, the control circuitry: generates signals to cause the electronic circuit to process data, the processing data including: masking each block of data with a first mask; applying a non-linear block substitution operation based on a substitution box to the masked data; and unmasking a result of the application of the non-linear block substitution with a second mask, wherein the electronic circuit, in operation, recalculates the substitution box, block by block, before applying the non-linear block substitution operation and an order of processing of the blocks of the substitution box is subjected to a permutation; and generates signals to control a side-channel attack on the block by block recalculating of the substitution box. In an embodiment, the control circuitry, in operation, extracts at least one of the masks based on results of the side-channel attack. In an embodiment, the attack is a differential power analysis at least of second order. In an embodiment, the control circuitry, in operation, compares a result of the attack to at least one of the masks. In an embodiment, the permutation is random and the recalculation of the substitution box is based on the second mask, a third mask and a fourth mask, a combination of the third and fourth masks being equal to the first mask. In an embodiment, the permutation is commutative with the non-linear substitution operation. In an embodiment, the control circuitry, in operation, verifies a sensitivity the electronic to side-channel attacks based on a result of the side-channel attack.

In an embodiment, a method comprises: generating, using control circuitry, signals to cause an electronic circuit to process data, the processing data including: masking each block of data with a first mask; applying a non-linear block substitution operation based on a substitution box to the masked data; and unmasking a result of the application of the non-linear block substitution with a second mask, wherein the electronic circuit, in operation, recalculates the substitution box, block by block, before applying the non-linear substitution operation and an order of processing of the blocks of the substitution box is subjected to a permutation; and generating, by the control circuitry, signals to control a side-channel attack on the block by block recalculating of the substitution box by the electronic circuit. In an embodiment, the method comprises extracting, by the control circuitry, at least one of the masks based on results of the side-channel attack. In an embodiment, the side-channel attack is a differential power analysis at least of second order. In an embodiment, the permutation is random and the recalculation of the substitution box is based on the second mask, a third mask and a fourth mask, a combination of the third and fourth masks being equal to the first mask. In an embodiment, the permutation is commutative with the non-linear substitution operation.

DETAILED DESCRIPTION

The same elements have been designated with the same reference numerals in the different drawings unless the context indicates otherwise. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the applications of the executed encryptions/decryptions or of the electronic circuits executing them have not been detailed, the described embodiments being compatible with usual applications.

The embodiments will be described hereafter in relation with an example of application to the AES. However, all that is described hereafter more generally applies to any block algorithm involving a non-linear substitution operation, such as Rijndael-type algorithms.

The AES is generally executed by integrated circuits, either by means of wired logic state machines, or by means of microprocessors executing a program in a memory (generally, a ROM). The algorithm uses secret keys specific to the integrated circuit or to the user, which are processed to encrypt the data. For example, the AES applies, to a word or data code divided into blocks, a same transformation a plurality of times in a row based on different encryption sub-keys (portions of a binary word forming a key).

The AES is often used in electronic devices of microcircuit card, decoder, cell phone, or other type.

Figure 1:
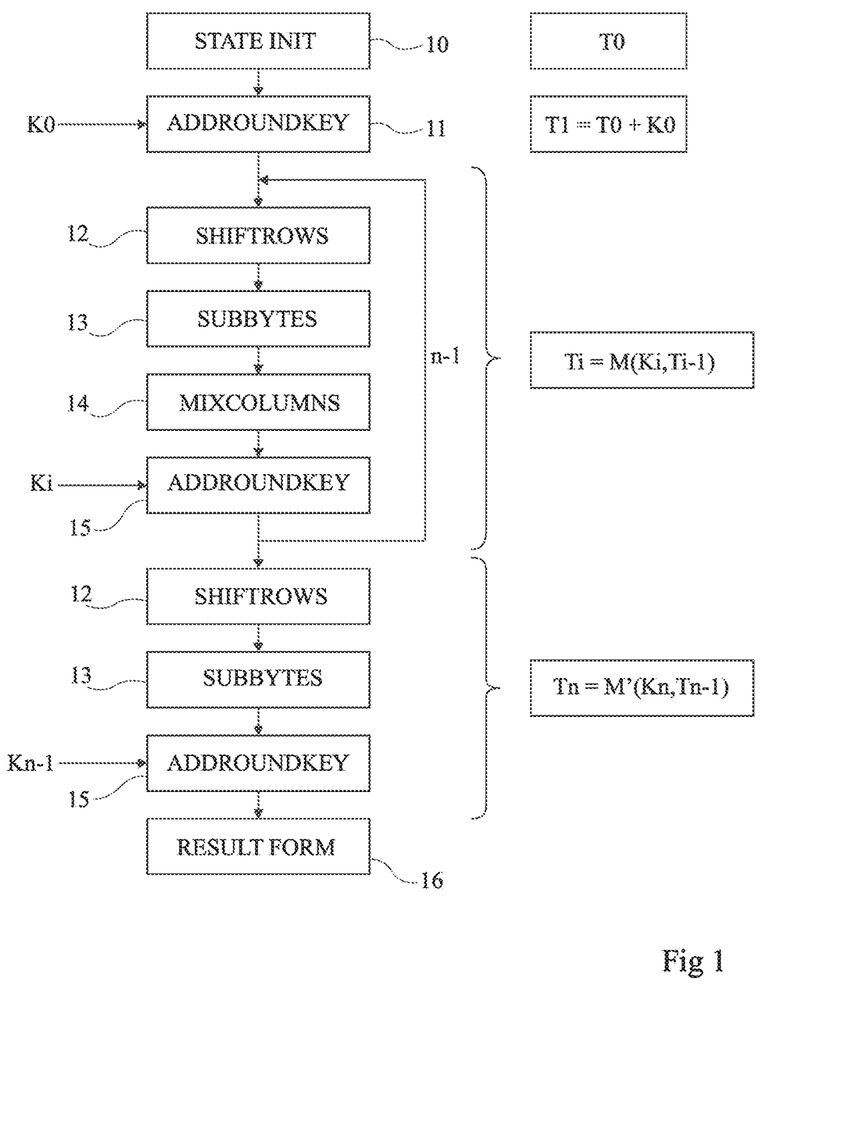
FIG. 1 illustrates in a simplified diagram an AES-type algorithm.

FIG. 1 illustrates in a simplified diagram of an AES-type algorithm. Only the encryption will be described, the decryption involving the reverse transformations. For more details, reference can be made to work "The Design of Rijndael" of Joan Daemen and Vincent Rijmen, Springer-Verlag Eds (ISBN 3-540-42580-2) and to the AES standard (FIPS PUB 197).

This algorithm encrypts a word or code T0 of a determined number of bits into another word or code Tn of same size. The data (message) to be processed are divided into a plurality of words or codes all having the same size (128 bits for the AES). The encryption and the decryption rely on a secret key having its length (128, 192, or 256 bits for the AES) conditioning the encryption security.

In practice, each step of the AES processes an array of four rows and four columns, representing a word, each element thereof being a byte or block of the processed 128-bit code. To simplify the following description, reference will be made, for each step, to a state considered as being an array. An AES algorithm applied to 32-bit words divided into bytes, which corresponds to the most frequent case, is taken as an example.

It is started by generating, based on the secret key over 128, 192, or 256 bits, respectively 11, 13, or 15 sub-keys each also comprising 128 bits. These sub-keys are intended to be used by the algorithm described in relation with FIG. 1.

It is started from an initial state T0 (block 10, STATE INIT) of the code or data word to be encrypted.

A first phase of the AES is an operation (block 11, ADDROUNDKEY) which comprises performing an XOR-type combination, noted+ in the drawings, of initial state T0 with first sub-key K0. A first intermediate state T1 is obtained. In practice, the operations are performed byte by byte.

A second phase comprises performing a plurality of rounds or cycles of a same transformation M involving, for each round i, state Ti−1 obtained at the previous round and a current sub-key Ki. The number of rounds of transformation M corresponds to n−1, that is, to number n+1 of derived sub-keys, decreased by 2. Each round transformation M is formed of four successively-applied operations.

A first operation (block 12, SHIFTROWS) comprises performing a rotation on the last three rows of the array. Typically, the first row of the array remains unchanged, the second row is rotated by one byte, the third row is rotated by two bytes, and the fourth row is rotated by three bytes.

A second operation (block 13, SUBBYTES) of round transformation M is a non-linear transformation where each byte of the array forming the current state is replaced with its image, taken from a substitution box, generally called SBOX. This substitution box may be obtained by two combined transformations. A first transformation comprises reversing the considered byte (the element of the array) in the finite body of order $2^8$ (to correspond to the byte), byte 00 forming its own image. This reversal is followed by an affine transformation.

A third operation (block 14, MIXCOLUMNS) of round transformation M comprises considering each column of the array resulting from the previous step as a polynomial on the finite body of order $2^8$, and multiplying each of these polynomials by a polynomial of combination modulo another polynomial.

A fourth and last operation (block 15, ADDROUNDKEY) of round transformation M of rank i comprises applying sub-key Ki to the array resulting from the previous state to obtain an array where each byte of the array resulting from the previous state has been combined by XOR, bit to bit, with a byte k, or Ki(j, 1), of sub-key Ki, j representing the rank between 0 and 3 of the row in the array and 1 representing the rank between 0 and 3 of the column in the array. Operation 15 is the same as operation 11 of the first phase of the encryption, however performed with a different sub-key.

At the end of operation 15, for a round of rank i, a state Ti=M(Ki, Ti−1) is obtained. The four operations of the round transformation are repeated n−1 times, that is, after operation 15, it is returned to operation 12 to perform a new round with a next sub-key.

The third phase of the AES comprises a last round comprising operations 12, 13, and 15 of round transformation M except for the third one (MIXCOLUMNS) with, as a key for operation 15, last sub-key Kn−1.

State Tn=M'(Kn, Tn−1) is then obtained. This result may be shaped (block 16, RESULT FORM) for a subsequent use.

The order of operation 12, 13, 14, and 15 in round transformation M may vary. For example, the introduction of the sub-key (step 15) may occur before substitution operation 13.

Different countermeasures have already been provided to decrease the sensitivity of AES-type algorithmic processings to side-channel attacks and particularly to attacks by analysis of the current consumption of the circuit executing the algorithm.

Generally, such countermeasures mask the calculations by introducing random numbers at certain steps considered as sensitive. In particular, the substitution box is considered as a step sensitive to attacks due to the non-linear character of the operation that it executes. A substitution box generally corresponds to an array of 256 arrays which has to be precalculated, and then to be read from a storage memory 16 times for each round of the AES algorithm. In certain cases, a box is stored with the results of the substitution box (also called SBOX) and of column transformation MIXCOL-UMNS, the stored box and the results of the two transformations being applied to a byte of each state.

To mask a substitution box, a masked substitution box which is used in the round transformation is recalculated. Masking a substitution box imposes taking into account, for the calculation thereof, the mask which will be used to unmask the encrypted result.

Figure 2:
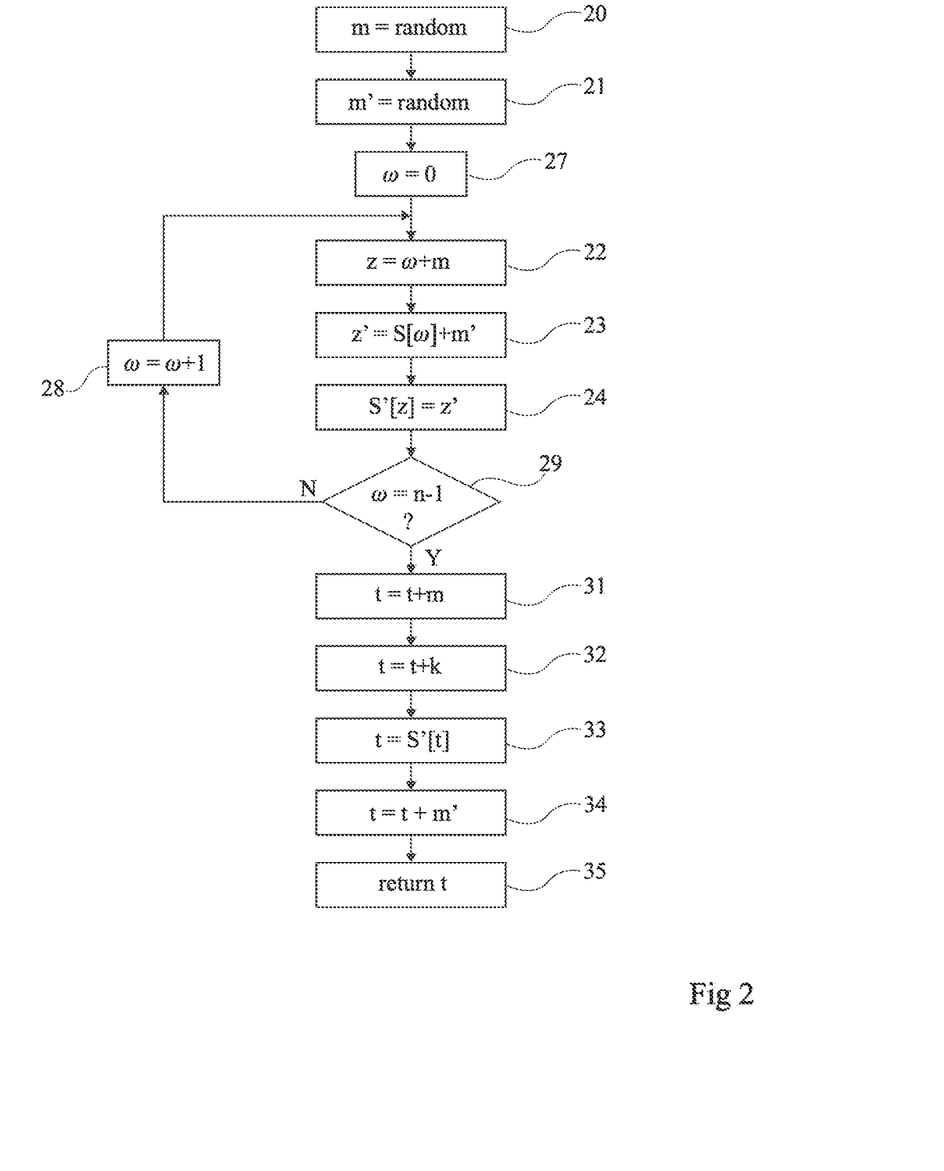
FIG. 2 schematically shows in the form of blocks an example of masking of such a substitution box of a block encryption.

FIG. 2 schematically shows in the form of blocks an example of masking of a substitution box of a block encryption.

In the example of FIG. 2, the substitution (step 13, FIG. 1) is assumed to be performed after step 15 where the round key is used. Further, step 14 (MIXCOLUMNS) is considered to be integrated in the substitution operation, that is, the substitution box performs the two operations 13 and 14. For simplification, operation 12 (SHIFTROWS) is not taken into account.

It is started (block 20, m=random), (block 21, m'=random), by defining two respective masking and unmasking masks (random numbers) m and m'. Numbers m and m' correspond to bytes.

Then, successively for each byte S[ω] of rank ω of substitution box S, a combination (block 22, z=ω+m) by XOR (which is noted as a bit-to-bit addition operation +) of rank ω of the byte with mask m is performed, the result thereof being placed in a temporary variable z. Then (block 23, z'=S[ω]+m), byte S[ω] is combined with mask m', the result thereof being placed in a temporary variable z'. Then (block 24, S'[z]=z'), the value contained in variable z' is assigned to byte S'[z] of rank z of masked substitution box S'.

For example, a counter ω is initialized to 0 (block 27, ω=0) and is incremented by 1 (block 28, ω=ω+1) for each processing of a byte of box S as long as not all bytes have been processed (output N of block 29, ω=n−1?).

Once the n bytes S[ω] of substitution box S have been processed (output Y of block 29), masked substitution box S' is used to process the message byte by byte (block by block).

Thus, each byte t of the message is combined (block 31, t=t+m) by XOR with mask m, the result thereof being placed in variable t (by overwriting byte t), and is then combined (block 32, t=t+k) by XOR with a byte k of the sub-key by overwriting byte t in variable t, and is substituted (block 33, S'[t]) by its image S'[t] in masked substitution box S'. Variable t containing image S'[t] is then unmasked (block 34, t=t+m') by being combined by XOR with mask m'. The content of variable t is then returned.

Steps 31 to 35 are repeated for all bytes t of the message.

The calculation illustrated in FIG. 2 may also be written as follows:

m←random number (block 20)
m'←random number (block 21)
For ω=0 to n−1 (block 27, output N of block 29, block 28):
   z←ω+m (block 22)
   z'←S[ω]+m' (block 23)
   S'[z]=z' (block 24)
End of loop (output Y of block 29)
t←t+m (block 31)
t←t+k (block 32)
t←S'[t] (block 33)
t←t+m' (block 34)
Return t (block 35).

DPA attacks, said to be of second order or of higher order, have made AES algorithms still more vulnerable, including when they use a random mask. DPA attacks of second order comprise isolating, in a same current trace, the signature of the mask and that of the masked data (in the example of the AES, the box). By combining the signatures and, in the case of the AES, by repeating the attack a plurality of times, the mask (the random number) can be directly or indirectly discovered.

To improve the protection of a substitution box against these types of attacks, the order in which substitution box S is recalculated may be mixed to obtain masked box S'.

For example, a random permutation φ which is used to define the order in which bytes S[ω] of the substitution box are masked by numbers m and m' is used.

Figure 3:
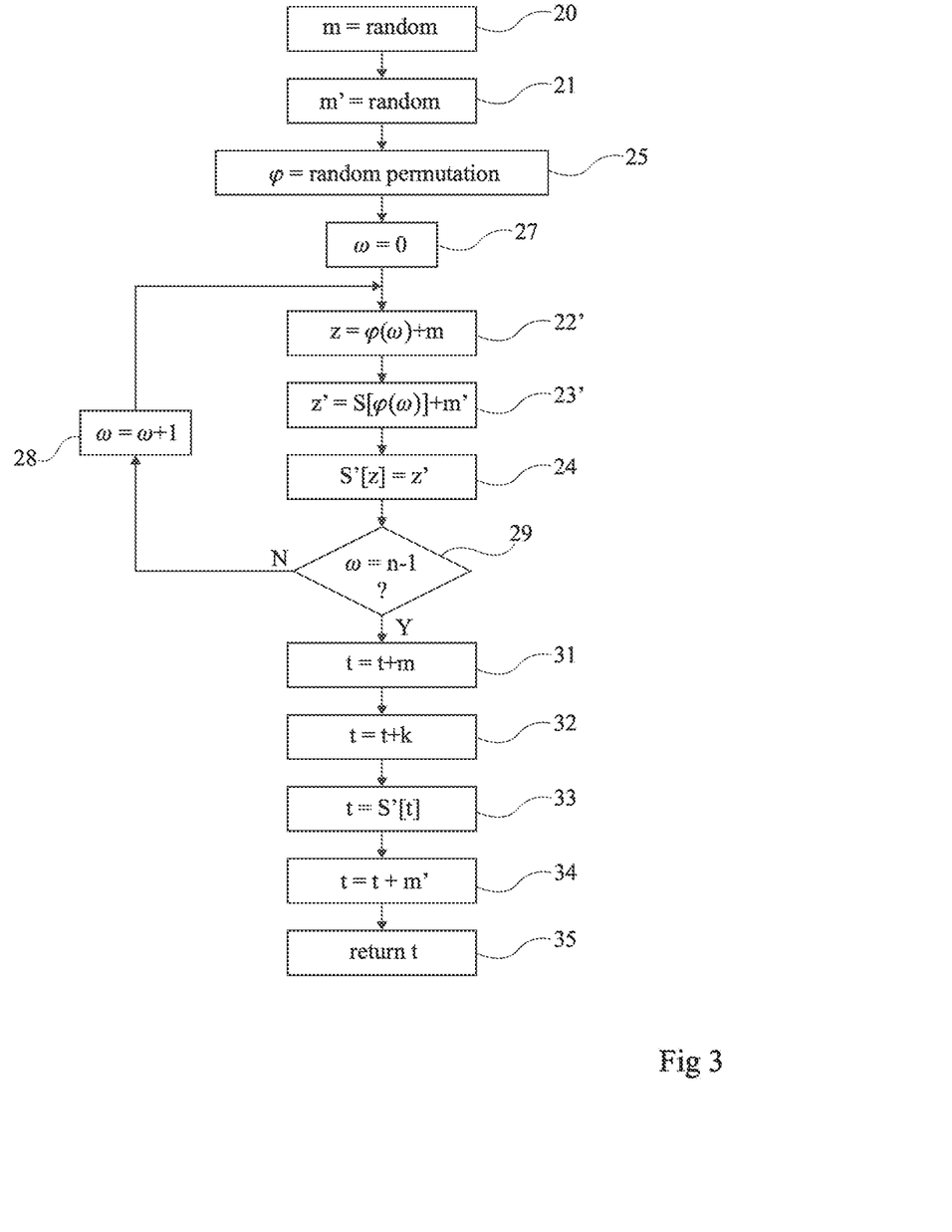
FIG. 3 schematically shows in the form of blocks an example of masking of a substitution box recalculated with a random order.

FIG. 3 schematically shows in the form of blocks an example of masking of a substitution box recalculated with a random order.

As compared with the method described in relation with FIG. 2, this amounts to selecting (block 25, φ=random permutation) a random permutation φ applicable in all n rows ω, and replacing, in steps 22 and 23, the taking into account of rank ω of the bytes of the substitution box by the taking into account of result φ(ω) of the application of permutation function φ to rank ω (block 22', z=φ(ω)+m and block 23', z'=S[φ(ω)]+m'). This amounts to modifying the order in which the bytes of the substitution box are recalculated, and thus masked. As illustrated, he other steps described in relation with FIG. 2 are not modified.

The calculation illustrated in FIG. 3 may also be written as follows:

m←random number (block 20)
m'←random number (block 21)
φ←random permutation (block 25)
For ω=0 to n−1 (block 27, output N of block 29, block 28):
   z←φ(ω)+m (block 22')
   z'←S[φ(ω)]+m' (block 23')
   S'[z]z'(block 24)
End of loop (output Y of block 29)
t←t+m (block 31)
t←t+k (block 32)
t←S'[t] (block 33)
t←t+m' (block 34)
Return t (block 35).

The inventor has however noticed a weakness which makes this countermeasure vulnerable to a DPA attack of a still higher order.

Such a weakness originates from the actual masking of the substitution box. Indeed, the fact for random permutation φ to be unknown has the advantage that the value of rank ω in the loop (blocks 22', 23', 24) remains unknown from a possible attacker. However, twice in each loop (steps 22' and 23'), rank ω is manipulated. Accordingly, it is possible for an attacker to exploit the security "leak" linked to the two manipulations for each loop of current rank ω. In particular, the consequence of step 23' is that function φ is present all over the substitution box, that is, in practice, 256 times, which represents as many leaks. By combining the results of steps 22' and 23', the contribution of function φ is eliminated. An attack on step 32, though more complicated than in FIG. 2, becomes efficient again.

Actually, the embodiment of FIG. 3 facilitates addressing the problem of attacks of second order on the value of mask m. However, an attack of third order enables to discover the secret from the moment that the attacker is capable of identifying, in the current trace, steps 22' and 23', and thus the leak points.

In an embodiment, the resistance of an electronic circuit to an attack such as described hereabove is desired to be assessed. For this purpose, the attack is executed and it is detected whether or not it is efficient.

An embodiment facilitates improving the resistance of a Rijndael-type block encryption algorithm against side-channel attacks.

In an embodiment, the operation of step 22' (FIG. 3) does not appear in the recalculation of the box.

Figure 4:
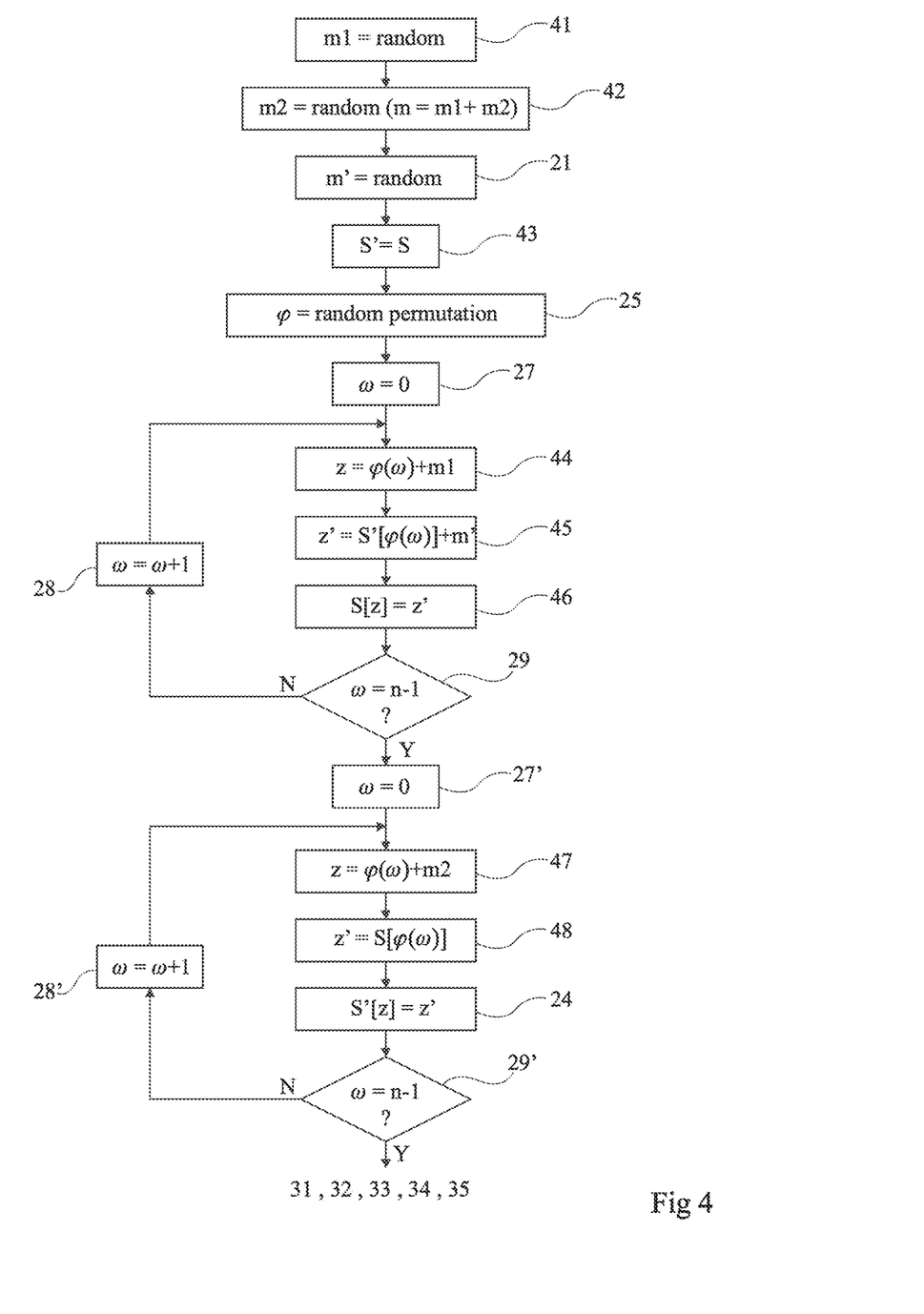
FIG. 4 schematically shows in the form of blocks an embodiment of a method of protecting the execution of an AES algorithm.

In an embodiment, random number m is divided in two and the masking of the substitution box is carried out in two steps. FIG. 4 schematically shows in the form of blocks an example embodiment.

It is started (block 41, m1=random), (block 42, m2=random, m=m1+m2), by defining two masks (random numbers) m1 and m2 such that their XOR combination corresponds to a random number m (the number which will be used at step 31). As previously, random unmasking value m' (block 21, m'=random) and a random permutation (block 25, φ=random permutation) applicable in all n ranks ω are then defined. Masks m1, m2, m, and m' correspond to bytes. A masked substitution box S' is also initialized with the values of unmasked substitution box S (block 43, S'=S). The order of steps 21 and 43 (or 43 and 21) with respect to steps 41 and 42 is of no importance.

Then, the recalculation of the substitution box is divided in two loops, a first time using random number m1 on box S', a second time using random number m2 on box S originating from the first loop.

Thus, successively, for each byte S'[ω] of rank ω of substitution box S', permutation function φ is applied to rank ω and a XOR combination (block 44, z=φ(ω)+m1) of result φ(ω) with mask m1 is performed, the result thereof being placed in a temporary variable z. Then (block 45, z'=S'[φ(ω)]+m'), byte S'[φ(ω)] is combined with mask m', the result thereof being placed in a temporary variable z'. Then (block 46, S[z]=z'), the value contained in variable z' is assigned to byte S[z] of rank z of unmasked substitution box S.

For example, a counter w is initialized to 0 (block 27, w=0) and is incremented by 1 (block 28, ω=ω+1) for each processing of a byte of box S' as long as not all bytes have been processed (output N of block 29, ω=n−1?).

Once the n bytes S'[ω] of substitution box S' initialized at 43 have been processed (output Y of block 29) with portion m1 of number m, the bytes of substitution box S resulting from the first loop are recovered to be masked with portion m2.

Thus, successively, for each byte S[ω] of rank w of substitution box S, permutation function φ is applied to rank ω and a XOR combination (block 47, z=φ(ω)+m2) of result φ(ω) with mask m2 is performed, the result thereof being placed in variable z. Then (block 48, z'=S[φ(ω)]), byte S[φ(ω)] of substitution box S resulting from the first loop is placed in variable z'. Then (block 24, S'[z]=z'), the value contained in variable z' is assigned to byte S'[z] of rank z of masked substitution box S'.

For example, for the loop calculation, a counter ω is initialized to 0 again (block 27, ω=0) and is incremented by 1 (block 28, ω=ω+1) for each processing of a byte of box S originating from the first loop as long as not all bytes have been processed (output N of block 29', ω=n−1?).

Once the n bytes S[φ(ω)] of substitution box S originating from the first loop have been processed with portion m2 of number m (output Y of block 29'), resulting masked substitution box S' is used to process the message byte by byte (block by block) and execute steps 31 to 35 as described in FIGS. 2 and 3.

The calculation illustrated in FIG. 4 may also be written as follows:

m1←random number (block 41)
m2←random number (block 42)
m'←random number (block 21)
S'←S (block 43)
φ←random permutation (block 25)
For ω=0 to n−1 (block 27, output N of block 29, block 28):
  z←φ(ω)+m1 (block 44)
  z'←S'[φ(ω)]+m' (block 45)
  S[z]=z' (block 46)
End of loop (output Y of block 29)
For ω=0 to n−1 (block 27', output N of block 29', block 28'):
  z←φ(ω)+m2 (block 47)
  z'←S[φ(ω)] (block 48)
  S'[z]=z' (block 24)
End of loop (output Y of block 29')
t←t+m (block 31, FIG. 3)
t←t+k (block 32, FIG. 3)
t←S'[t] (block 33, FIG. 3)
t←t+m' (block 34, FIG. 3)
Return t (block 35, FIG. 3).

Figure 5:
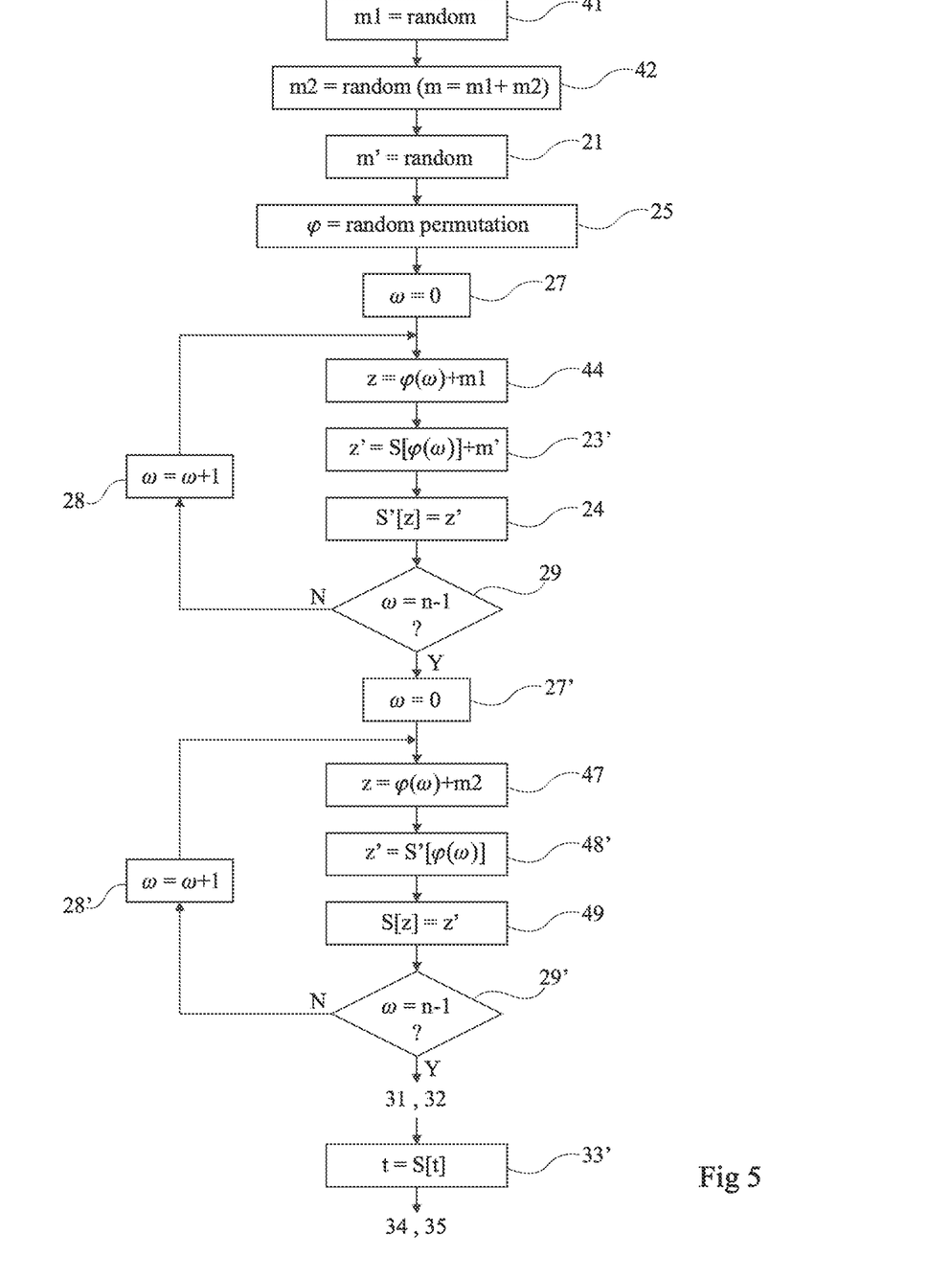
FIG. 5 schematically shows in the form of blocks another embodiment of a method of protecting the execution of an AES algorithm.

FIG. 5 schematically shows in the form of blocks an embodiment of an electronic system.

It is started (block 41, m1=random), (block 42, m2=random, m=m1+m2), by defining two masks (random numbers) m1 and m2 such that their XOR combination corresponds to a random number m (the number which will be used at step 31). As previously, random unmasking value m' (block 21, m'=random) and a random permutation (block 25, φ=random permutation) applicable in all n ranks w are defined. Masks m1, m2, m, and m' correspond to bytes. The order of steps 21 and 43 (or 43 and 21) with respect to steps 41 and 42 is of no importance.

The recalculation of the substitution box is divided in two loops, a first time using random number m1 on box S, a second time using random number m2 on box S' originating from the first loop.

Thus, successively, for each byte S[ω] of rank ω of substitution box S', permutation function φ is applied to rank ω and a XOR combination (block 44, z=φ(ω)+m1) of result φ(ω) with mask m1 is performed, the result thereof being placed in a temporary variable z. Then (block 23', z'=S[φ(ω)]+m), byte S'[φ(ω)] is combined with mask m', the result thereof being placed in a temporary variable z'. Then (block 24, S'[z]=z'), the value contained in variable z' is assigned to byte S'[z] of rank z of masked substitution box S'.

For example, a counter ω is initialized to 0 (block 27, ω=0) and is incremented by 1 (block 28, ω=ω+1) for each processing of a byte of box S as long as not all bytes have been processed (output N of block 29, ω=n−1?).

Once the n bytes S[ω] of substitution box S have been processed (output Y of block 29) with portion m1 of number m, the bytes of substitution box S' resulting from the first loop are recovered to be masked with portion m2.

Thus, successively, for each byte S'[ω] of rank ω of substitution box S', permutation function φ is applied to rank ω and a XOR combination (block 47, z=φ(ω)+m2) of result φ(ω) with mask m2 is performed, the result thereof being placed in variable z. Then (block 48, z'=S'[φ(ω)]), byte S'[φ(ω)] of substitution box S' resulting from the first loop is then placed in variable z'. Then (block 49, S[z]=z'), the value contained in variable z' is assigned to byte S[z] of rank z of substitution box S.

For example, for the loop calculation, a counter ω is initialized to 0 again (block 27', ω=0) and is incremented by 1 (block 28', ω=ω+1) for each processing of a byte of box S' originating from the first loop as long as not all bytes have been processed (output N of block 29', ω=n−1?).

Once (output Y of block 29') the n bytes S[φ(ω)] of substitution box S' originating from the first loop have been processed with portion m2 of number m, the resulting substitution box S, which here forms the masked substitution box, is used to process the message byte by byte (block by block). Thus, step 33 described in relation with FIGS. 2 and 3 takes the bytes of box S and not those of box S' (block 33', t=S[t]). As illustrated, steps 31, 32, 34, and 35 are not modified with respect to the embodiment of FIGS. 2 and 3.

As compared with the embodiment of FIG. 4, the initialization of box S' is spared (block 43, FIG. 4).

The calculation illustrated in FIG. 5 may also be written as follows:

m1←random number (block 41)
m2←random number (block 42)
m'←random number (block 21)
φ←random permutation (block 25)
For ω=0 to n−1 (block 27, output N of block 29, block 28):
  z←φ(ω)+m1 (block 44)
  z'←S[φ(ω)]+m' (block 23')
  S'[z]=z' (block 24)
End of loop (output Y of block 29)
For ω=0 to n−1 (block 27', output N of block 29', block 28'):
  z←φ(ω)+m2 (block 47)
  z'←S'[φ(ω)] (block 48')
  S[z]=z' (block 49)
End of loop (output Y of block 29')
t←t+m (block 31, FIG. 3)
t←t+k (block 32, FIG. 3)
t←S[t] (block 33')
t←t+m' (block 34, FIG. 3)
Return t (block 35, FIG. 3).

The fact of dividing mask m into two portions m1 and m2 and to execute the calculation of the substitution box twice makes the attack more difficult.

Figure 6:
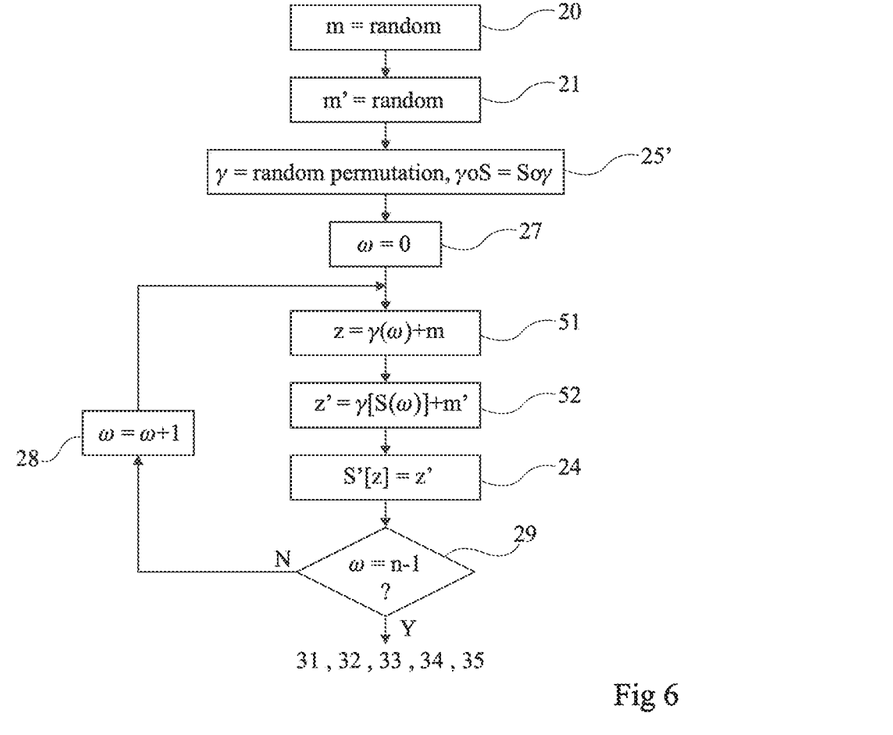
FIG. 6 schematically shows in the form of blocks still another embodiment of a method of protecting the execution of an AES algorithm.

In an embodiment, during the recalculation of the substitution box, a function is employed of commutative permutation with the substitution operation. FIG. 6 schematically shows in the form of blocks an embodiment.

It is started (block 20, m=random), (block 21, m'=random), as in FIG. 2, by defining two respective masking and unmasking masks (random numbers) m and m'.

Then (block 25', γ=random permutation, γoS=So γ), a random permutation commutative with the substitution box is selected.

Then, successively, for each byte S'[ω] of rank ω of substitution box S, permutation function γ is applied to rank ω and a XOR combination (block 51, z=γ(ω)+m) of result γ(ω) with mask m is performed, the result thereof being placed in a temporary variable z. Then (block 52, z'=γ(S[ω]+m'), the result of the application of function γ to byte S[(ω)] is combined with mask m', the result thereof being placed in a temporary variable z'. Then (block 24, S'[z]=z'), the value contained in variable z' is assigned to byte S'[z] of rank z of masked substitution box S'. As in the previous embodiments, a counter ω is for example initialized at 0 (block 27, ω=0) and is incremented by 1 (block 28, ω=ω+1) for each processing of a byte S[ω] of box S as long as not all bytes have been processed (output N of block 29, ω=n−1?).

Once the n bytes S[ω] of substitution box S have been processed (output Y of block 29), the resulting masked substitution box S' is used to process the message byte by byte (block by block) and to execute steps 31 to 35 as described in FIGS. 2 and 3.

As compared with FIG. 3, value γ(ω) only appears once per loop. It is thus not possible to combine it within the loop to exploit a current trace. However, since function γ is commutative with substitution operation S, the result of step 52 is the same as that of step 23' of FIG. 3, which allows the unmasking.

The calculation illustrated in FIG. 6 may also be written as follows:
m←random number (block 20)
m'←random number (block 21)
γ←random permutation commutative with substitution operation S (block 25')
For ω=0 to n−1 (block 27, output N of block 29, block 28):
  z←γ(ω)+m (block 51)
  z'←γ(S[ω])+m' (block 52)
  S'[z]z'(block 24)
End of loop (output Y of block 29)
t←t+m (block 31)
t←t+k (block 32)
t←S'[t] (block 33)
t←t+m' (block 34)
Return t (block 35).

In an embodiment, the raising to any power, which may be random, of the substitution box, may be used as a function γ commutative with the substitution operation.

The implementation of an embodiment of verifying the sensitivity to the attack facilitates verifying whether the countermeasure described in relation with FIGS. 4 to 6 is implemented or not by the electronic circuit.

In practice, the different values, bytes, variables, etc. are physically stored into registers of one or a plurality of electronic circuits and the content of these registers may be read and/or written according to control signals depending on the method steps. The electronic circuit is for example a processor for executing the described algorithm having input, output registers, and configured to manipulate the different values. The calculation and substitution steps are for example carried out by elements in wired logic integrated to the processor.

Figure 7:
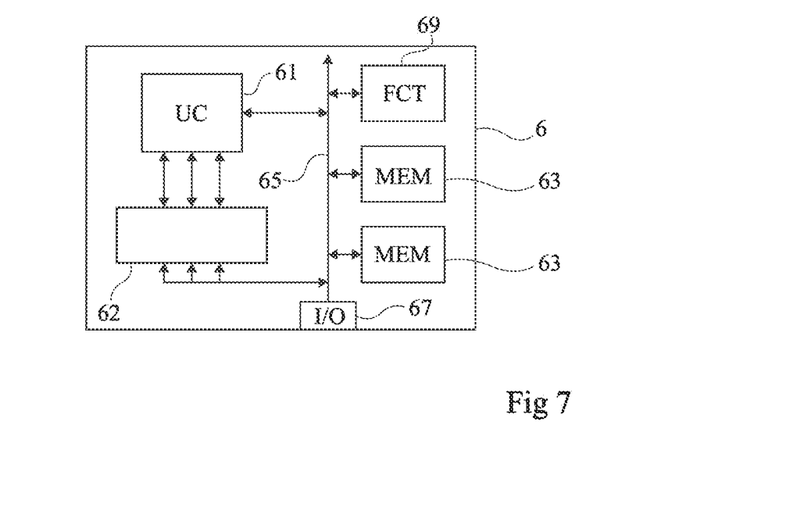
FIG. 7 shows an example of an electronic circuit to implement the described methods.

FIG. 7 very schematically shows an example of an electronic circuit 6 of the type to which the embodiments which will be described apply.

Circuit 6 comprises:
a calculation unit 61 (UC), for example, a state machine, a microprocessor, a programmable logic circuit, etc. comprising or using registers 62, containing different variables used for the calculation and arbitrarily shown in FIG. 7 outside of unit 61;
one or a plurality of volatile and/or non-volatile storage areas 63 (MEM) for storing all or part of the data and keys;
one or a plurality of data, address, and/or control buses 65 between the different elements internal to circuit 6 and an input-output interface 67 (I/O) for communicating with the outside of circuit 6.

Circuit 6 may include various other circuits according to the application, symbolized in FIG. 7 by a block 69 (FCT). For example, block 69 may comprise circuitry (e.g., a controller, etc.) configured to subject the calculation circuit 61 to a side-channel attack. Block 69 may be external to the circuit 6.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Various embodiments have been described. Various alterations and modifications will occur to those skilled in the art. In particular, the integration of the above-described steps in the round processings of the AES algorithm is within the abilities of those skilled in the art based on the above description. Finally, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
verifying a sensitivity of an electronic circuit executing a Rijndael-type algorithm to side-channel attacks, wherein:
each block of data to be processed is masked with a first mask before applying a non-linear block substitution operation based on a substitution box, and is then unmasked with a second mask after the substitution;
the substitution box is recalculated, block by block, before applying the non-linear substitution operation, an order of processing of the blocks of the substitution box being submitted to a permutation; and
the verifying includes:
performing a side-channel attack on the recalculating, block by block, of the substitution box; and
determining the sensitivity of the electronic circuit based on a result of the side-channel attack.

2. The method of claim 1 wherein the attack is a differential power analysis at least of second order.

3. The method of claim 1 wherein the determining comprises comparing the result of the attack to at least one of the masks.

4. The method of claim 1 wherein the electronic circuit is determined to be sensitive to the attack if the result of the attack provides a value of at least one of the masks.

5. The method of claim 1 wherein the permutation is random and the recalculation of the substitution box is based on the second mask, a third mask and a fourth mask, a combination of the third and fourth masks being equal to the first mask.

6. The method of claim 5 wherein the executing of the Rijndael-type algorithm includes:
successively for each block in the first substitution box:
submitting a rank of a current block is submitted to said permutation and combining a result of the permutation of the rank of the current block with the third mask; and
replacing the current block of a second box with a combination of the second mask with a block of the first box identified by the result of the permutation of the rank of the current block; and
successively for each block in the second substitution box:
submitting a rank of a current block to said permutation and combining a result of the permutation of the rank of the current block with the fourth mask; and
replacing the current block of the first substitution box with a block of the second substitution box identified by the result of the permutation of the rank of the current block.

7. The method of claim 5 wherein the executing of the Rijndael-type algorithm includes:
successively for each block in the first box:
in a first step, applying the permutation to a rank of a current block, combining a result of the permutation of the rank of the current block with the first mask, and storing a result of the combination in a first variable;
in a second step, storing in a second variable a result of a combination of the second mask with a block of the first box having a rank of the result of the permutation applied to the rank of the current block; and
storing the second variable in a block of a second box having a rank of the first variable; and
successively for each block in the second box:
in a third step, applying the permutation to a rank of a current block, combining a result of the permutation of the rank of the current block with the second mask, and storing a result of the combination in the first variable;
in a fourth step, storing in the second variable the block of the second box having a rank the result of the permutation applied to the rank of the current block; and
storing the second variable in a block of the first box having a rank of the first variable.

8. The method of claim 5 wherein the executing of the Rijndael-type algorithm includes:
copying the blocks of the first box into a second box;
successively for each block in the second box:
submitting a rank of a current block to said permutation and combining a result of the permutation of the rank with the third mask; and
replacing the current block of the first box with a combination of the second mask with a block of the second box identified by the result of the permutation of the rank; and
successively for each block in the first box:
submitting a rank of a current block to said permutation and combining a result of the permutation of the rank with the fourth mask; and
replacing the current block of the second box is replaced with the block of the first box having a rank of the result of the permutation of the rank of the current block.

9. The method of claim 5 wherein the executing of the Rijndael-type algorithm includes:

copying the blocks of the first box into a second box;
successively for each block in the second box:
  in a first step, applying the permutation to a rank of a current block, combining a result of the permutation of the rank with the first mask, and storing the combination in a first variable;
  in a second step, storing in a second variable a result of a combination of the second mask with a block of the second box having a rank of the result of the permutation of the rank of the current block; and
  storing the second variable in a block of the first box having a rank of the first variable; and
successively for each block in the first box:
  in a third step, applying the permutation to a rank of a current block, combining a result of the permutation of the rank with the second mask, and storing the combination in the first variable;
  in a fourth step, storing in the second variable a block of the first box having a rank of the result of the permutation of the current rank; and
  storing the second variable in a block of the second box having a rank of the first variable.

10. The method of claim 1 wherein the permutation is commutative with the non-linear substitution operation.

11. The method of claim 10 wherein the executing of the Rijndael-type algorithm includes:
successively for each block in the substitution box:
  submitting a rank of the block to said permutation and combining the permutated rank with the first mask;
  submitting the block to the permutation and combining the permutated block with the second mask; and
  replacing a block having a rank equal to the combination of the permutated rank and the first mask with the combination of the permutated block and the second mask.

12. The method of claim 10 wherein the executing of the Rijndael-type algorithm includes:
successively for each block in the substitution box:
  applying the permutation to a rank of a current block;
  combining the permutated rank with the first mask; and
  storing a value of the combination of the permutated rank and the first mask in a first variable;
  applying the permutation to the current block;
  combining the permutated block with the second mask; and
  storing a value of the combination of the permutated block with the second mask in a second variable; and
  replacing the block of the substitution box having as a rank the stored value of the first variable with the stored value of the second variable.

13. The method of claim 12 wherein the combinations are of an XOR type.

14. The method of claim 1 wherein the masks are random numbers.

15. The method of claim 1 wherein the masks have a same size as a block.

16. The method of claim 1 wherein the executing of the Rijndael-type algorithm includes applying an Advanced Encryption Standard algorithm.

17. An apparatus, comprising:
an interface configured to couple to an electronic circuit; and
control circuitry coupled to the interface, wherein, in operation, the control circuitry:
  generates signals to cause the electronic circuit to process data, the processing data including:
    masking each block of data with a first mask;
    applying a non-linear block substitution operation based on a substitution box to the masked data; and
    unmasking a result of the application of the non-linear block substitution with a second mask, wherein the electronic circuit, in operation, recalculates the substitution box, block by block, before applying the non-linear substitution operation and an order of processing of the blocks of the substitution box is subjected to a permutation; and
  generates signals to control a side-channel attack on the block by block recalculating of the substitution box.

18. The apparatus of claim 17 wherein the control circuitry, in operation, extracts at least one of the masks based on results of the side-channel attack.

19. The apparatus of claim 17 wherein the attack is a differential power analysis at least of second order.

20. The apparatus of claim 17 wherein the control circuitry, in operation, compares a result of the attack to at least one of the masks.

21. The apparatus of claim 17 wherein the permutation is random and the recalculation of the substitution box is based on the second mask, a third mask and a fourth mask, a combination of the third and fourth masks being equal to the first mask.

22. The apparatus of claim 17 wherein the permutation is commutative with the non-linear substitution operation.

23. The apparatus of claim 17 wherein the control circuitry, in operation, verifies a sensitivity of the electronic to side-channel attacks based on a result of the side-channel attack.

24. A method, comprising:
generating, using control circuitry, signals to cause an electronic circuit to process data, the processing data including:
  masking each block of data with a first mask;
  applying a non-linear block substitution operation based on a substitution box to the masked data; and
  unmasking a result of the application of the non-linear block substitution with a second mask, wherein the electronic circuit, in operation, recalculates the substitution box, block by block, before applying the non-linear substitution operation and an order of processing of the blocks of the substitution box is subjected to a permutation; and
generating, by the control circuitry, signals to control a side-channel attack on the block by block recalculating of the substitution box by the electronic circuit.

25. The method of claim 24, comprising extracting, by the control circuitry, at least one of the masks based on results of the side-channel attack.

26. The method of claim 24 wherein the side-channel attack is a differential power analysis at least of second order.

27. The method of claim 24 wherein the permutation is random and the recalculation of the substitution box is based on the second mask, a third mask and a fourth mask, a combination of the third and fourth masks being equal to the first mask.

28. The method of claim 24 wherein the permutation is commutative with the non-linear substitution operation.

* * * * *